United States Patent [19]

Hager et al.

[11] Patent Number: 5,477,226

[45] Date of Patent: Dec. 19, 1995

[54] LOW COST RADAR ALTIMETER WITH ACCURACY ENHANCEMENT

[75] Inventors: James R. Hager, Golden Valley; Gregory J. Haubrich, Champlin, both of Minn.

[73] Assignee: Honeywell Inc., Minneapolis, Minn.

[21] Appl. No.: 239,652

[22] Filed: May 9, 1994

[51] Int. Cl.[6] .................................................. G01S 13/08
[52] U.S. Cl. ........................................... 342/120; 342/122
[58] Field of Search ................................... 342/120, 122, 342/118

[56] References Cited

U.S. PATENT DOCUMENTS

| | | | |
|---|---|---|---|
| 3,544,996 | 12/1970 | Pile | 342/120 |
| 4,509,049 | 4/1985 | Haendel et al. | 342/120 |
| 4,568,938 | 2/1986 | Ubriaco | 342/120 |
| 4,599,618 | 7/1986 | Haendel et al. | 342/120 |
| 4,739,330 | 4/1988 | Lazarus | 342/122 |
| 4,924,230 | 5/1990 | Martin | 342/90 |
| 4,924,231 | 5/1990 | Prenat | 342/137 |
| 4,945,360 | 7/1990 | Trummer et al. | 342/122 |
| 5,014,063 | 5/1991 | Studenny | 342/130 |
| 5,016,016 | 5/1991 | Strauch | 342/87 |
| 5,047,778 | 9/1991 | Cofield et al. | 342/97 |
| 5,047,779 | 9/1991 | Hager | 342/120 |
| 5,160,933 | 11/1992 | Hager | 342/174 |

Primary Examiner—J. Woodrow Eldred
Attorney, Agent, or Firm—Thomas A. Rendos

[57] ABSTRACT

A low cost frequency modulated (FM) radar altimeter system with enhanced accuracy for continuously providing an altitude of a target, comprising a transmitter means for transmitting a carrier modulated output signal towards the target; a receiver means having an altitude output signal for receiving the carrier modulated output signal reflected from the target after a time delay, and for providing an open loop error correction means for correcting errors resulting from nonlinearities in the transmitter means and signal processing delay variations in the receiver means so that the altitude determined is accurate; a coupling means for directing a portion of the carrier modulated output signal to the receiver means, and searching means having a first output directed to the receiver means and a second output directed to the transmitter means and having a symmetrical search output signal with a slope, $s_s$, and a fixed period for providing continuous and repeated sweeping from a low altitude to a high altitude, an upsweep, and then back down to the low altitude, a downsweep, so that the radar altimeter is in a constant searching mode, and for automatically altering a search rate of the radar altimeter with changes in the slope, $s_s$, of the search output signal so that the sensitivity of the radar altimeter increases as the slope, $s_s$, decreases.

16 Claims, 2 Drawing Sheets

LOW COST RADAR ALTIMETER WITH ACCURACY ENHANCEMENT

FIELD OF THE INVENTION

This invention relates generally to a radar altimeter system for use in the low cost altimeter or fuse market. More particularly, this invention relates to a frequency modulated (FM) radar altimeter system with enhanced accuracy and having the capability of providing continuous altitude.

BACKGROUND OF THE INVENTION

In a typical frequency modulated continuous waveform (FMCW) radar altimeter system, a continuous radio frequency (RF) signal is repetitively swept by a fixed frequency modulating signal to produce a carrier modulated output signal for transmission toward a target. The FM signal is then reflected off the ground back to a receiver. This reflected signal is mixed with a portion of the transmitted signal to produce a frequency shift indicative of the distance from the transmitter to the target. By controlling the modulation of the transmitted signal and by detecting the frequency shift, readings of the distance to a target can be determined.

Modulation non-linearities and signal processing delay variations in the receiver, however, introduce errors into an FMCW radar altimeter system, and thus reduce the system's accuracy. Current systems incorporate costly and complex closed loop circuitry to eliminate such errors and improve the system's accuracy. There are generally two methods currently used for improving the accuracy of these systems. One method involves using a fixed frequency bandpass filter. The frequency shift is detected by adjusting the slope of the modulating signal so that the frequency shift stays within the bandwidth of the filter. The other method, on the other hand, involves using a variable center frequency filter while keeping the slope of the modulating signal constant. The frequency shift is detected by controlling the movement of the center frequency of the filter in a closed loop fashion so that it changes with corresponding changes in the frequency shift. State of the art implementations of this technique incorporate a digital Fast Fourier Transform system so that a plurality of selectable filters may be realized. Systems using such techniques are described in U.S. Pat. Nos. 4,509,049, 4,568,938, and 4,568,938.

Such methods, however, add both to the complexity of the altimeter and to its cost. They also impact on the construction of the altimeter. Present radar altimeter systems must be quite large in order to accommodate the above-mentioned additional circuitry.

Accuracy also depends upon the system's sensitivity, especially at higher altitude ranges (i.e., long range targets). Present systems lack the ability to alter the sensitivity of the altimeter by automatically decreasing the search rate at higher altitudes.

The present invention has therefore been developed to provide a low-cost FM radar altimeter system with enhanced accuracy which overcomes the limitations of the above-known and similar techniques.

SUMMARY OF THE INVENTION

According to the present invention, a low cost FM radar altimeter system with enhanced accuracy for providing continuous altitude is provided. The system comprises transmitter means for transmitting a carrier modulated output signal with a slope, $s_m$, and a frequency, $f_t$, toward a target, receiver means having an altitude output signal for receiving the carrier modulated output signal reflected from the target after a time delay, and having a frequency $f_r$, coupling means for directing a portion of the carrier modulated output signal to the receiver means, and searching means having a first output directed to the transmitter means and second output directed to the receiver means, and having a symmetrical search output signal with a slope, and fixed period for providing continuous and repeated sweeping from a low altitude to a high altitude, an upsweep, and then back down to the low altitude, a downsweep, so that the radar altimeter is in a constant searching mode, and for automatically altering a search rate of the radar altimeter with changes in the slope of the search output signal so that the sensitivity of the radar altimeter increases as the slope of the search output signal decreases.

The search output signal operates to change the slope of the modulating signal, which in turn controls the frequency sweep rate of the transmitter means, such that the frequency sweep rate varies from both a high sweep rate to a low sweep rate and from a low sweep rate to a high sweep rate alternately and repeatedly. Additionally, the search output signal is shaped to provide a relatively slow change in the sweep rate associated with higher altitudes. As a result, the altimeter provides a slower searching rate at high altitudes than at low altitudes, thereby providing more return energy and thus more sensitivity at higher altitudes. Due to the search up and search down characteristic of the search output signal, errors resulting from non-linearities in the transmitter means and signal processing delay variations in the receiver means are effectively cancelled out. As a result, the average produced represents an accurate altitude of the detected target, which can thereafter be directed to a display. For a better understanding of the invention and its advantages, reference should be had to the drawings which form a further part hereof, and to the accompanying descriptive matter in which there is illustrated and described a preferred embodiment of the invention.

DETAILED DESCRIPTION OF THE INVENTION

Figure 1:
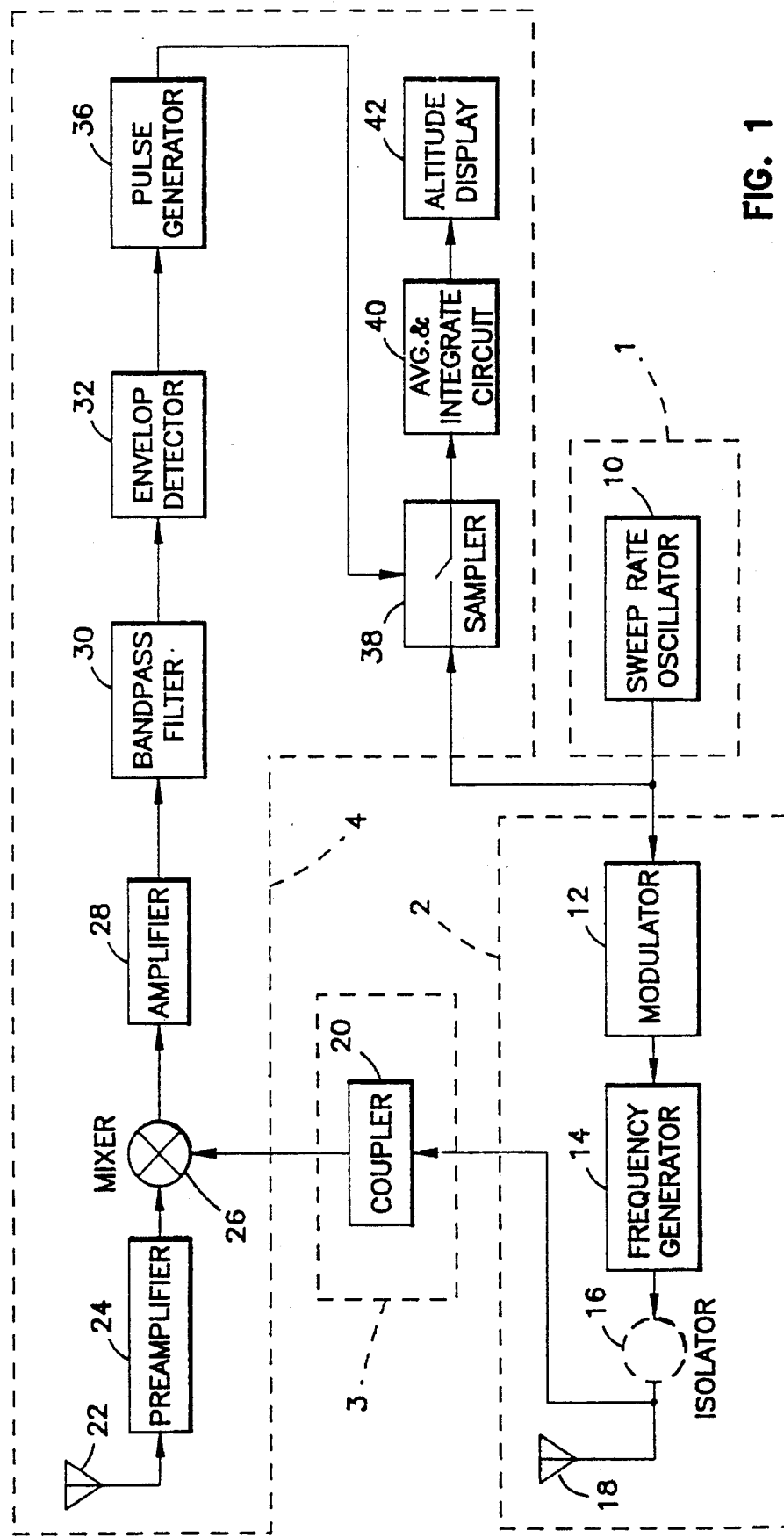
FIG. 1 is a block diagram of an FM radar altimeter system compatible with the present invention.
Figure 3A:
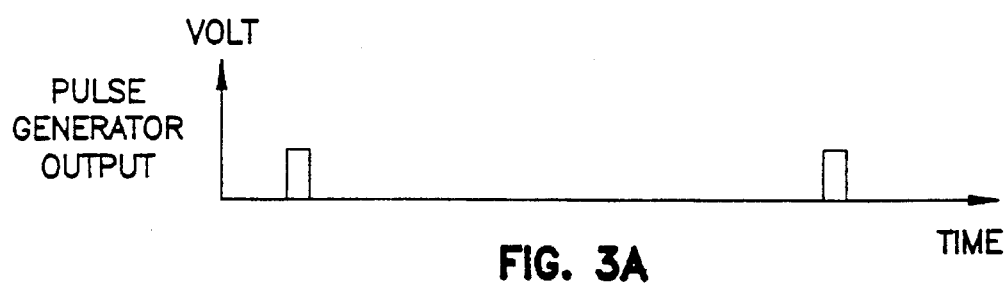
FIG. 3A is a pulsed waveform showing an example of an output of a pulse generator for a given altitude.

Referring now to the drawings, wherein like numerals are used to refer to like elements throughout, FIG. 1 shows an FM radar altimeter system of the present invention. The present radar altimeter in its preferred embodiment operates in the following manner. A transmitter means 1 provides a frequency generator 14, which is FM modulated with the modulating signal generated by a modulator 12. As can be seen by reference to FIG. 3B, the modulating signal can be, but is not limited to, a symmetrical triangular waveform of constant amplitude and adjustable frequency. A symmetrical trapezoidal waveform may as well be incorporated. Modulator 12 in turn causes frequency generator 14 to provide a linear frequency versus time sweep, also known as the carrier modulated output signal, as shown in FIG. 3C, to both the transmitting antenna 18 and also, at a lower power level, to an input of a mixer 26. Transmitter 2 may also provide an isolator 16 connected between a coupler mechanism 3 and frequency generator 14 for improving the linearity of the carrier modulated output signal as its frequency is swept across the bandwidth of transmitting antenna 18.

Unlike existing systems, a searching mechanism 1 provides a sweep rate oscillator 10 which supplies the frequency control voltage for modulator 12 and acts as the internal range indication of the altimeter. As can be seen by reference to FIG. 2, the output of sweep rate oscillator 10 is a full-wave rectified sinewave. The voltage of this waveform corresponds to altitude, such that low voltages represent low altitudes and high voltages represent high altitudes. The signal sweeps from a low altitude to a high altitude and then back down to a low altitude repeatedly and continuously. This causes the altimeter to be in a continual search mode. In addition, this signal provides for automatically altering the sensitivity of the altimeter with changes in altitude, such that the search rate will be slower for higher altitudes than for lower altitudes. This is accomplished by the changes in the slope of the search output signal.

A portion of the transmitted signal is then reflected off the target and received by a receiving antenna 22 in a receiver 4. A preamplifier 24 may be provided for amplifying the reflected signal so that the sensitivity of the radar altimeter system is improved. A coupler 20 in coupling mechanism 3 couples a portion of the transmitting signal to mixer 26, which also receives reflected signals through receiving antenna 22 after a time delay. Mixer 26 thereafter provides a frequency shift, $f_d$, which represents the difference in frequency between the signal directed by transmitting antenna 18 toward a target and the reflected signal received by receiving antenna 22. This frequency shift is proportional to altitude due to the time delay in receiving the reflected signal, and the slope, $s_m$, of the carrier modulated signal from modulator 12. The slope of the carrier modulated signal corresponds to a slope of the modulating signal, which in turn corresponds to a voltage on the search output signal. This voltage represents the altitude of the detected target. An increase in the slope of the modulating signal corresponds to a low voltage condition on the search output signal (i.e., low altitude). Likewise, a decrease in the slope of the modulating signal corresponds to a high voltage condition on the search output signal (i.e., high altitude).

The mixer is coupled to a bandpass filter 30 having a fixed center frequency, $f_c$ and a bandwidth, $b_w$. The frequency shift, $f_d$, passes through the filter when the slope or frequency sweep rate of the carrier modulated signal has the following relationship:

$$s_m = \frac{(f_c \pm b_w)}{\text{time delay}}$$

The accuracy of the radar altimeter system is dependent directly upon the accuracy of the reflected signal's frequency. As a result, it was previously required to have an extremely narrowband return spectrum in order to maintain the required altitude accuracy. The invention herein described overcomes this problem by providing a search output signal which continuously varies the slope of the modulating signal. This in turn varies the frequency sweep rate of frequency generator 14 from both a high sweep rate to a low sweep rate and from a low sweep rate to a high sweep rate, alternately and repetitively. As a result, the frequency shift, $f_d$, passes through filter 30 at a much slower rate at higher altitudes than at lower altitudes, thereby providing more return energy and thus more sensitivity at higher altitudes. Currently, varying the slope or frequency sweep rate of frequency generator 14 is done in only one direction, namely from a higher frequency sweep rate to a lower frequency sweep rate. The present invention, however, provides for the varying of the frequency sweep rate not only from a higher frequency sweep rate to a lower frequency sweep rate, but also from a lower frequency sweep rate to a higher frequency sweep rate. This allows for the averaging of the higher and lower frequency shift components of the reflected signal as they move through the bandwidth $b_w$ of filter 30.

The output of filter 30 is then coupled to an envelope detector 32 which is in turn coupled to a post detection filter 34. Envelope detector 32 essentially strips the output of filter 30 of its radio frequency component to provide a pulsed video signal with each upsweep and downsweep of sweep rate oscillator 10. This occurs each time the frequency shift $f_d$ passes through filter 30, as illustrated in FIG. 3A.

As a result, a series of pulses are generated. Each pair of pulses in the series of pulses corresponds in time to the frequency shift during the upsweep of the search output signal and the frequency shift during the downsweep of the search output signal, respectively. These pulses are then fed into an open loop error correction mechanism 5. This mechanism comprises a pulse generator 36 which provides a preset threshold level whereby only pulses at or greater than that level activate a sampler 38. When sampler 38 is activated, the output signal of sweep rate oscillator 10 is sampled at times corresponding to the pulses generated by pulse generator 36. Errors introduced into the system are effectively cancelled out by an averaging an integrate circuit 40 which averages the sampled search output signal. This average represents the altitude of the detected target. The altitude is then integrated with a time constant corresponding to the maximum altitude change rate of the aircraft on which the altimeter is located. The output of the averaging and integrate circuit 40 can thereafter be directed to a display device 42 for indicating the altitude of the target.

Figure 2:
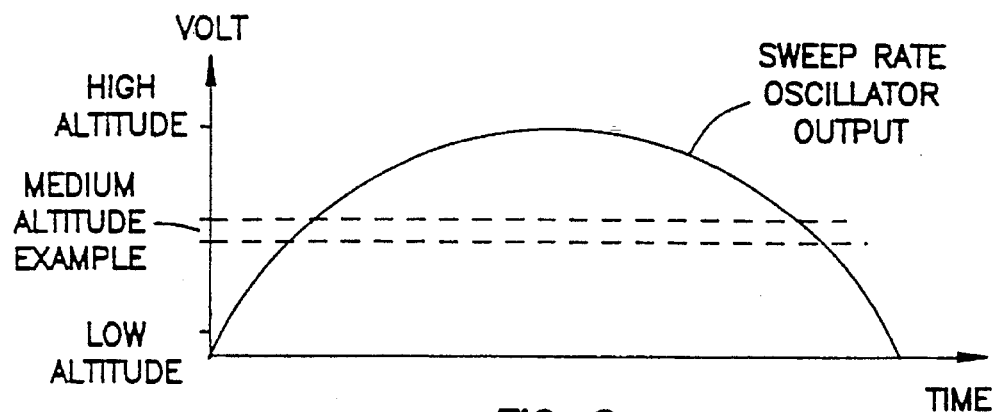
FIG. 2 is a full-wave rectified sinewave showing an example of a waveform generated by a sweep rate oscillator.
Figure 3B:
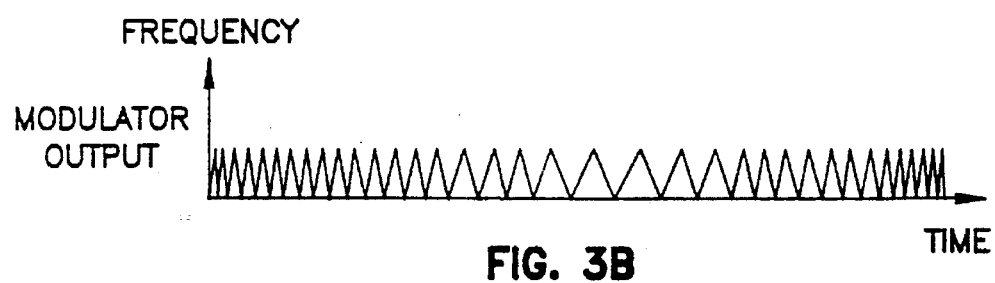
FIG. 3B is a triangular waveform showing an example of an output of a modulator.
Figure 3C:
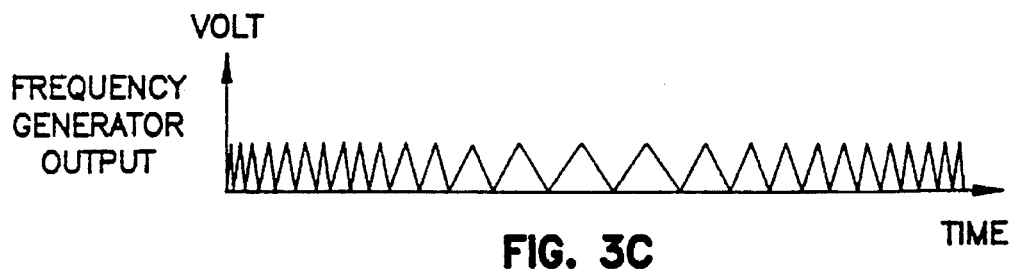
FIG. 3C is triangular modulated waveform showing an example of an output of a frequency generator.

With reference to FIGS. 2, 3A, 3B, and 3C, a preferred system has been shown with a target detected at a medium altitude. In particular, FIG. 2 shows a portion of the search output signal of sweep rate oscillator 10. FIG. 3B shows an example of the modulating signal generated by modulator 12. As can be seen in the figure, the search output signal controls the slope of the modulating signal such that it increases with corresponding decreases in the amplitude of the search output signal (i.e., low altitudes) and decreases with corresponding increases in the amplitude of the search output signal (i.e., high altitudes). FIG. 3C shows an example of a carrier modulated output signal generated by frequency generator 14. The modulating signal in FIG. 3B controls the sweep rate of frequency generator 14, such that the frequency sweep rate increases at sweep rate oscillator 10 outputs representing low altitudes, and decreases at sweep rate oscillator 10 outputs representing high altitudes.

After the carrier modulated output signal in FIG. 3C is transmitted and reflected off a target, it is received by receiver 4, where it is amplified, bandpass filtered and detected. When the detected signal is greater than a preset threshold level, pulse generator 36 generates a signal like that shown in FIG. 3A. The first pulse corresponds to a target being detected during the upsweep. As can be seen, the width of the pulse, and likewise its energy, increases with higher altitudes, thereby producing the increased sensitivity necessary to ensure that accurate altitudes are detected. The search output signal in FIG. 2 is then sampled by sampler 38 at the two times corresponding to the two pulses generated, averaged and integrated by averaging and integrate circuit 40, so that it can thereafter displayed by altitude display device 42. In one preferred embodiment, a radar altimeter system for determining altitudes between the ranges of 200 feet to 3,000 feet was provided. A 10 Hz fullwave rectified sinewave is used as the waveform for sweep rate oscillator 10. A symmetrical trianglewave of constant amplitude, but adjustable frequency (16–240 kHz), is chosen for modulator 12. A symmetrical trapezoidal wave form could also be used. An isolator can also be added to an output of frequency generator 14 to improve the frequency tuning linearity of frequency generator 14. The isolator can be implemented as an active isolator/buffer amplifier (GaAsFET and a Pl Pad) in the interest of cost savings. A GaAsFET can also be added ahead of mixer 26 to improve sensitivity. An optimal characteristic of filter 30 is a bandwidth of 400 KHz and a center frequency of 9 MHz.

It is to be understood, however, that even though numerous advantages and characteristics of the invention have been set forth in the foregoing description, together with the details of the structure and function of the preferred system, the disclosure of the present application is illustrative only, and many other modifications and variations of the preferred system are possible in light of the above teachings. It is therefore to be understood that within the full extent indicated by the broad general meanings of the terms in which the appended claims are expressed, the invention may be practiced otherwise than as specifically described.

What is claimed is:

1. A low cost frequency modulated (FM) radar altimeter system with enhanced accuracy for continuously providing an altitude of a target, comprising:
    (a) transmitter means for transmitting a carrier modulated output signal with a slope, $s_m$, and a frequency, $f_t$, toward the target;
    (b) receiver means having an altitude output signal for receiving the carrier modulated output signal reflected from the target after a time delay, and having a frequency $f_r$;
    (c) coupling means for directing a portion of the carrier modulated output signal to the receiver means; and
    (d) searching means having a first output directed to the transmitter means and a second output directed to the receiver means and having a symmetrical search output signal with a slope, and a fixed period for providing continuous and repeated sweeping from a low altitude to a high altitude, an upsweep, and then back down to the low altitude, a downsweep, so that the radar altimeter is in a constant searching mode, and for automatically altering a search rate of the radar altimeter with changes in the slope of the search output signal so that the sensitivity of the radar altimeter increases as the slope of the search output signal decreases.

2. The radar altimeter of claim 1, wherein the transmitter means further comprises:
    (a) sweep modulating means connected to the first output of the searching means for providing a linear modulating signal;
    (b) carrier modulating means responsive to the sweep modulating means for receiving the linear modulating signal and for generating a carrier modulated output signal; and
    (c) a transmitting antenna having a bandwidth $b_t$, for receiving and directing the carrier modulated output signal toward the target.

3. The radar altimeter of claim 2, wherein the transmitter means further comprises an isolator connected between the carrier modulating means and the coupling means for improving the linearity of the carrier modulating means as the frequency, $f_t$, of the carrier modulated output signal is swept across the bandwidth, $b_t$, of the transmitting antenna.

4. The radar altimeter of claim 2, wherein the sweep modulating means further comprises a voltage controlled oscillator.

5. The radar altimeter of claim 2, wherein the carrier modulating means further comprises a radio frequency voltage controlled oscillator.

6. The radar altimeter of claim 2, wherein the sweep modulating means further comprises a means for generating the linear modulating signal which is a symmetrical triangular waveform having a constant amplitude and an adjustable slope.

7. The radar altimeter of claim 2, wherein the sweep modulating means further comprises a means for generating the linear modulating signal which is a symmetrical trapezoidal waveform having an adjustable slope.

8. The radar altimeter of claim 1 and claim 2, wherein the receiver means further comprises:
    (a) a receiving antenna;
    (b) mixer means having a first input for the receiving antenna and a second input for the coupling means for providing a frequency shift, $f_d$, corresponding to a difference between the frequency, $f_t$, of the carrier modulated output signal directed to target and the frequency, $f_r$, of the reflected carrier modulated output signal;
    (c) amplifier means for receiving and amplifying the mixer output signal;
    (d) fixed filter means having a bandwidth, $b_w$, and a center frequency, $f_c$, for passing the amplified mixer output signal when the frequency shift, $f_d$, corresponds to the slope, $s_m$ of the carrier modulated output signal and the time delay;
    (e) envelope detector means for receiving and passing the amplified mixer output signal from the fixed filter means and for providing a pulsed video output signal with each upsweep and downsweep of the searching means so that a first pulse corresponding in time to the frequency shift, $f_d$, during the upsweep and a second pulse corresponding in time to the frequency shift, $f_d$, during the downsweep may be alternately and repetitively;generated; and
    (f) post detection filter means having a filtered pulsed video output signal for receiving and filtering the pulsed video output signal so that a signal-to-noise ratio of the pulsed video output signal is improved; and
    (g) open loop error correction means responsive to the filtered pulsed video output signal for correcting errors resulting from nonlinearities in the transmitter means and signal processing delay variations in the receiver means so that the altitude determined is accurate.

9. The radar altimeter of claim 8, wherein the receiver means further comprises:
    (a) a preamplifier means connected between the receiving antenna and the first output of the mixer means for amplifying the reflected carrier modulated output signal so that the sensitivity of the radar altimeter is improved.

10. The radar altimeter of claim 8, wherein the open loop error correction means further comprises:
   (a) pulse generating means having a series of pulses as an output signal for receiving the filtered pulsed video output signal and for providing a preset threshold level whereby only the pulses equal to or greater than the preset level are generated.
   (b) sampling means having a first altitude output with an amplitude, $A_1$, and a second altitude output with an amplitude, $A_2$, for sampling the search output signal at times corresponding to the pulses generated by the pulse generating means;
   (c) averaging means for receiving the first altitude output and the second altitude output of the sampling means, and for averaging the amplitudes $A_1$ and $A_2$ so that the errors are reduced and the altitude of the target determined is accurate; and
   (d) integration means for receiving the altitude of the averaging means and for integrating the altitude over a period of time corresponding to a maximum expected altitude.

11. The radar altimeter of claim 10, wherein the sampling means further comprises a means for sampling which is an electronic switch.

12. The radar altimeter of claim 8, wherein the open loop error correction means further comprises an altitude displaying means for displaying the altitude of the detected target.

13. The radar altimeter of claim 1, wherein the searching means further comprises a means for generating a search output signal which is a full-wave rectified sinewave.

14. A low cost frequency modulated (FM) radar altimeter system with enhanced accuracy for continuously providing an altitude of a target, comprising:
   (a) transmitter means for transmitting a carrier modulated output signal with a slope, $s_m$, and a frequency, $f_t$, toward the target, the transmitter means further comprising:
      (1) a transmitting antenna having a bandwidth, $b_t$, for receiving and directing the carrier modulated output signal toward the target;
      (2) sweep modulating means connected to the first output of the searching means for providing a linear modulating signal;
      (3) carrier modulating means responsive to the sweep modulating means for receiving the linear modulating signal and for generating a carrier modulated output signal; and
      (4) an isolator connected between the carrier modulating means and the coupling means for improving the linearity of the carrier modulating means, as the frequency, $f_t$, of the carrier modulated output signal is swept across the bandwidth, $b_t$, of the transmitting antenna;
   (b) receiver means having an altitude output signal for receiving the carrier modulated output signal reflected from the target after a time delay and having a frequency, $f_r$, the receiver means further comprising:
      (1) a receiving antenna;
      (2) mixer means having a first input for the receiving antenna and a second input for receiving a portion of the carrier modulated output signal for providing a frequency shift, $f_d$, corresponding to a difference between the frequency, $f_t$, of the carrier modulated output signal directed to the target and the frequency, $f_r$, of the reflected carrier modulated output signal;
      (3) amplifier means for receiving and amplifying the mixer output signal;
      (4) fixed filter means having a bandwidth, $b_w$, and a center frequency, $f_c$, for passing the amplified mixer output signal when the frequency shift, $f_d$, corresponds to the slope, $s_m$, of the carrier modulated output signal and the time delay;
      (5) envelope detector means for receiving and passing the amplified mixer output signal from the fixed filter means and for providing a pulsed video output signal with each upsweep and downsweep of the searching means so that a first pulse corresponding in time to the frequency shift, $f_d$, during the upsweep and a second pulse corresponding in time to the frequency shift, $f_d$, during the downsweep may be alternately and repetitively generated;
      (6) post detection filter means having a filtered pulsed video output signal for receiving and filtering the pulsed video output signal so that a signal-to-noise ratio of the pulsed video output signal is improved;
      (7) open loop error correction means responsive to the filtered pulsed video output signal for correcting errors resulting from nonlinearities in the transmitter means and signal processing delay variations in the receiver means so that the altitude determined is accurate, the open loop error correction means further comprising:
         (a) pulse generating means having a series of pulses as an output signal for receiving the filtered pulsed video output signal and for providing a preset threshold level whereby only the pulses equal to or greater than the preset level are generated;
         (b) sampling means having a first altitude output with an amplitude, $A_1$, and a second altitude output with an amplitude, $A_2$, for sampling the search output signal at times corresponding to the pulses generated by the pulse generating means;
         (c) averaging means for receiving the first altitude output and the second altitude output of the sampling means, and for averaging the amplitudes $A_1$ and $A_2$ so that the errors are reduced and the altitude of the target determined is accurate; and
         (d) integration means for integrating the altitude over a period of time corresponding to a maximum expected altitude;
   (c) coupling means for directing a portion of the carrier modulated output signal to the receiver means; and
   (d) searching means having a first output directed to the receiver means and a second output directed to the transmitter means and having a symmetrical search output signal with a slope, $s_s$, and a fixed period for providing continuous and repeated sweeping from a low altitude to a high altitude, an upsweep, and then back down to the low altitude, a downsweep, so that the radar altimeter is in a constant searching mode, and for automatically altering a search rate of the radar altimeter with changes in the slope $s_s$, of the search output signal so that the sensitivity of the radar altimeter increases as the slope, $s_s$, decreases.

15. The radar altimeter of claim 14, wherein the transmitter means further comprises:
   (a) an isolator connected between the carrier modulating means and the coupling means for improving the linearity of the carrier modulating means as the frequency, $f_t$, of the carrier modulated output signal is swept across the bandwidth, $b_t$, of the transmitting antenna.

16. The radar altimeter of claim 14, wherein the receiver means further comprises:

(a) a preamplifier means connected between the receiving antenna and the first output of the mixer means for amplifying the reflected carrier modulated output signal so that the sensitivity of the radar altimeter is improved.

* * * * *